United States Patent Office 2,756,524
Patented July 31, 1956

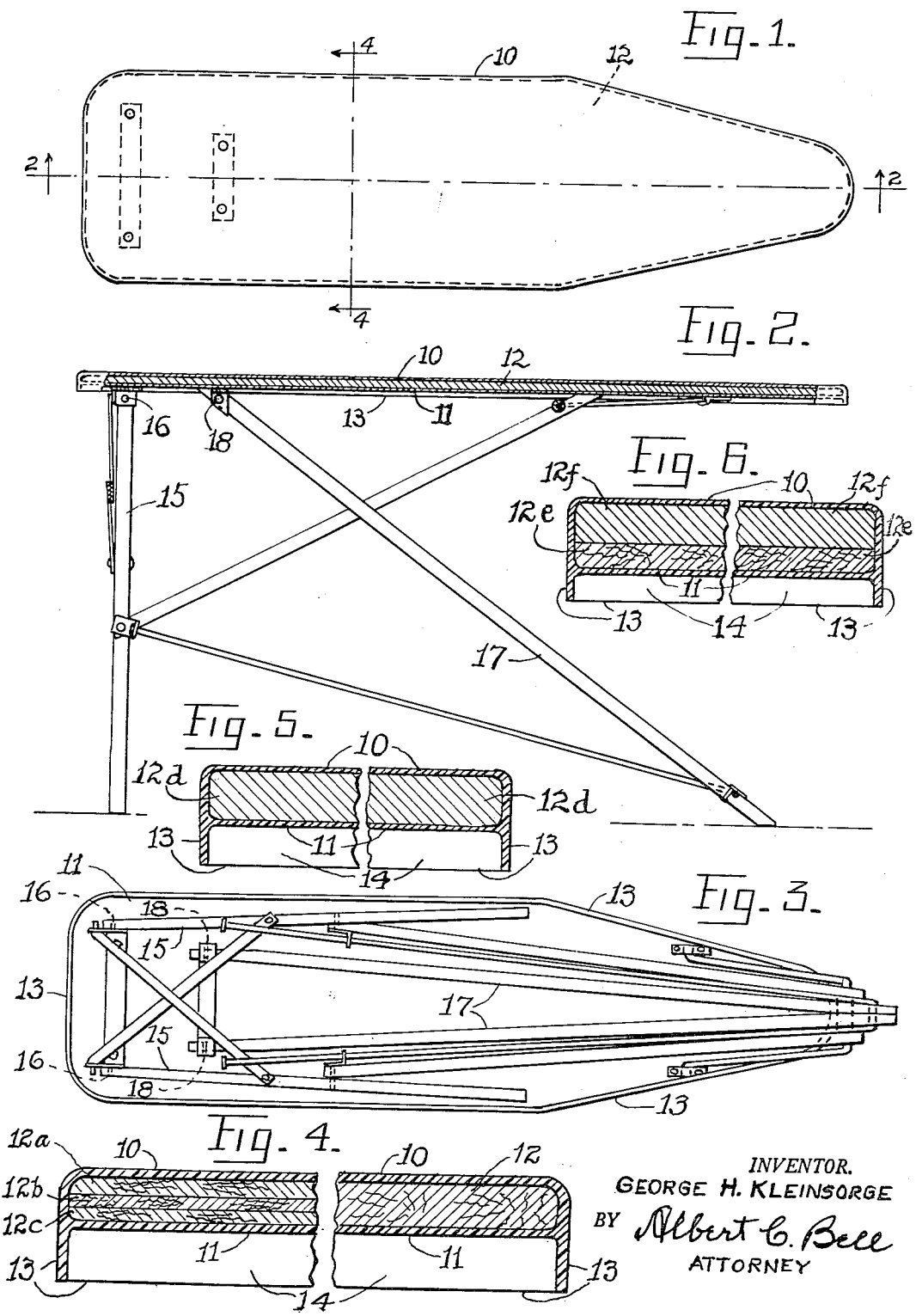

2,756,524

IRONING TABLE STRUCTURES

George H. Kleinsorge, Chicago, Ill.

Application July 19, 1952, Serial No. 299,867

1 Claim. (Cl. 38—137)

The invention pertains to a portable ironing table structure for supporting articles for hand ironing, which structure is waterproof, heat-resistant and heat reflective, and which at the same time is of light weight, and which is of sufficient stiffness and strength to adequately withstand all forces exerted on said structure during ironing operations, and which at the same time presents a smooth and even ironing surface without the use of an additional ironing cover or pad.

With the wide-spread use of steam irons now existing, problems not previously encountered have developed, including the excessive moistening of the ironing board and of the ironing board cover when the latter is used, and similarly moistening the ironing pads when the latter are used unless they are of waterproof construction.

In the past, ironing boards of wood have commonly been used, and such boards when subjected to the moisture from steam irons, have freely absorbed said moisture and have frequently been so warped thereby as to make them no longer serviceable. Again, with wooden ironing boards, a hard and unyielding ironing surface is presented, making desirable the use of additional ironing pads having the resilience required to smoothly iron materials of different kinds.

It is an object of the invention to overcome the objections referred to, by constructing a portable ironing table structure of top and bottom layers of thermosetplastic and waterproof resin in sheet form, having edge formations of substantially the form of the ironing surface, and placing between said top and bottom layers one or more layers of sheet core material of the same form as said top and bottom layers and in engagement with and closely adherent thereto; an important feature of the invention is extending said top and bottom layers around the edges of said core and fusing the edge portions of said top and bottom layers together to form a waterproof envelope entirely enclosing said core.

Where said top and bottom layers are initially of sheet form, they may extend at their fused edge portions from and entirely around the edge of said core, to form a vertical edge flange as below described.

It is a further object of the invention, to construct the core of the ironing structure, of stable and light weight material resistant to compressive pressures, for example, balsa wood or compressed fibrous cellulose material, or both, and to employ thermosetplastic resin for the top and bottom layers that has substantial tensile strength, as a result of which the ironing structure constructed as described, will be readily portable and will have the strength and rigidity to withstand all ironing pressures exerted upon it without deforming it and without the use of any stiffening or strengthening framework, said structure at the same time providing said core with a waterproof envelope of plastic material entirely enclosing it as above described and maintaining it in dry condition at all times.

It is a further object of the invention, to construct said top and bottom layers of thermosetplastic resin having substantially uniformly distributed therein, glass filaments closely adherent to said resin, which imparts great strength and stiffness to said resin, and permits less weight of said resin to be used than if said reinforcing filaments were not employed, without sacrificing any of the required strength and stiffness of the ironing structure, thereby producing an effective ironing table structure that is of substantially less weight than heretofore required for ironing boards of comparable size.

It is a further object of the invention, to extend the flange above referred to substantially below the bottom layer of the ironing structure, thereby forming a compartment for receiving in folded condition, the legs employed to support the ironing structure at a desired height in use, when folding legs are employed to so support said ironing structure.

The above and other objects of the invention will more fully appear by reference to the accompanying drawings illustrating preferred embodiments of the invention, in which:

Fig. 1 is a plan view of the improved ironing table structure,

Fig. 2 is a longitudinal, sectional view through the ironing structure, taken along the line 2—2 in Fig. 1, and shows said structure provided with folding legs in opened position, Fig. 3 is a bottom view of the ironing structure of Figs. 1 and 2, provided with folding legs of the kind shown in Fig. 2, but in folded position, Fig. 4 is a transverse, sectional view to an enlarged scale, of the ironing table structure of Fig. 1, taken along the line 4—4 in the latter figure, and Figs. 5 and 6 are views similar to Fig. 4 to a scale somewhat reduced from the scale of Fig. 4, showing modified forms of the core of the ironing structure.

Similar numerals refer to similar parts throughout the several views.

As shown in Figs. 1, 2, 3 and 4, the ironing table structure of the invention includes top and bottom layers 10 and 11 of thermosetplastic and waterproof resin between which a sheet of stable core material 12 is interposed, which core material is closely adjacent and adherent to said top and bottom layers 10 and 11. The thermosetplastic resin of the top and bottom layers extends closely around the edges of the core 12 to which edges it is adherent, in such a manner that a continuous and unbroken thickness of said resin entirely surrounds said core, and forms a waterproof envelope containing said core. This result is secured by fusing together the edge portions of the layers 10 and 11 around and in close engagement with the edges of the core 12.

The core 12 may have any size and shape desired for the ironing table structure, to adapt it for hand-ironing purposes. As shown, for example, in Fig. 1, said core and the finished ironing structure have substantially the form commonly employed heretofore with ironing boards of wood.

The material of the core 12 is preferably light-weight wood, for example, balsa wood, or compressed fibrous cellulose material, for example, some types of building boards commonly used in the building of houses for heat insulation and other purposes. The cross-sectional view shown in Fig. 4 is broken to afford a larger scale for the shown parts, it being understood that the actual cross-section is continuous from edge to edge of the ironing structure. In the right hand portion of Fig. 4, a core 12 of natural wood, for example, balsa wood, is illustrated in which the finished wood piece has a thickness equal to the thickness of the core, while in the left hand portion of said figure, a core of similar material, but of laminated or built-up construction consisting of layers 12a, 12b and 12c, is illustrated, which may be employed where the core and ironing structure are of considerable width, for example, 14 inches or more, which layers are securely fastened together with broken joints by suitable adhesive that is preferably waterproof, which laminated construction when used may extend for the full width of the core.

Fig. 5 illustrates a cross-sectional structure that is the same as shown in Fig. 4, excepting that in this case a core 12d is employed consisting of a single layer of compressed fibrous cellulose material, for example, building board. With this construction of core, the fibers of cellulose material adhere either by natural or applied adhesive material that is preferably waterproof, and the finished board is made by subjecting the fibers to great pressure either with or without the application of heat, depending on the nature of said fibers and of said adhesive material. The resulting board is stiff, strong, heat-resistant and waterproof, and well adapted to serve as core material for the improved ironing structure.

Fig. 6 illustrates a cross-sectional structure that employs the core structures of both Fig. 4 and Fig. 5, in that the core consists of a laminated structure including a layer 12e of core material as described in connection with Fig. 4, and a layer 12f of core material as described in connection with Fig. 5, said layers 12e and 12f being secured together by suitable adhesive that is preferably waterproof.

With any of said core constructions, the action of the finished ironing structure in use is as follows. The core material is of substantial thickness, and any applied forces tending to bend or twist the ironing structure, exert compressive forces on the core material tending to deform it; the core material by resisting said deformation, resists the applied bending or twisting forces, and the ironing structure remains in substantially flat condition. Furthermore, the application of said bending or twisting forces, because of the resistive action of said core material, tends to stretch and to subject to tensional forces, one or both of said top and bottom layers of thermosetplastic material, which latter material is adapted to withstand and resist the stretching action of said tensional forces, with the result that the ironing structure remains in substantially flat condition. Again, the application of bending or twisting forces to said ironing structure not only tends to stretch one of said top and bottom layers, but by simultaneously tending to compress the other of said layers, a buckling tendency of said other layer is produced, which buckling tendency is opposed and resisted by the adhesion of said other layer with the core material, which further tends to maintain the flat condition of the ironing structure.

Thus by selecting the thermosetplastic resin employed, to resist the deforming tendency of the forces described, by selecting stiff and strong material for said core to resist the compressive forces so involved, and by giving said core material substantial thickness, I have produced an ironing table structure that is of relatively light weight and that will not be deformed by ironing pressures exerted upon it.

The desirable results just described, are substantially increased in accordance with each of the described forms of the invention by using thermosetplastic resin for said top and bottom layers 10 and 11, that has incorporated in it a substantially uniform dispersal of glass fibers bonded to said resin that impart a greatly increased strength to said resin over what its strength would be without said fibers, thereby permitting the use of much less of said resin without decreasing the strength and stability of the ironing table structure, and correspondingly decreasing the weight thereof, without in any way sacrificing any of the advantages described. The precise ratio of glass fibers to thermosetplastic is not critical. It is important only that there be such an amount of the fibers as will give a satisfactory measure of reinforcement to the plastic material used.

Another feature of the invention which further increases the stability and strength of the ironing table structure, is shown in Fig. 4 consisting of a flange 13 integrally fused with the fused edge portions of the top and bottom layers 10 and 11, which flange is continuous around the entire outer edge of the bottom layer 11 and extends a substantial distance below and perpendicular to said bottom layer, forming a compartment 14 within said flange and below said bottom layer 11. The flange 13 thus imparts added stiffness and strength to the ironing table structure, depending on the depth and thickness of said flange. The flange 13 is a part of each of the structures shown in Figs. 5 and 6, and affords the advantages described, in connection with the structure of each of said latter figures. Where balsa wood is used for the core the thermosetplastic envelop should be about one-seventh of the thickness of the core and the depth of the under-side perimetrical flange should be substantially equal to the thickness of the core, as shown by Fig. 5.

It will be observed that, although the core layers 12d in Figs. 5 and 6 are cellulose fibers tightly compressed, and as a result are effective in withstanding compressive forces exerted on the core laterally and longitudinally of the ironing structure, said layers are not perfectly rigid vertically of said structure, since regardless of how tightly compressed said layers may be, they still possess a small amount of resilience vertically, which is an advantage in ironing some fabrics and garments, in that it permits the top layer 10 to yield and accommodate itself to small unevennesses in thickness of the articles ironed. It will also be observed that with the core construction shown in Fig. 6, for types of said ironing structures for use with fabrics and garments requiring considerable resilience of the ironing surface to effectively iron said articles, the fibrous material of the layer 12f may be compressed different amounts producing correspondingly different amounts of vertical resilience of said layer 12f, without materially changing the stiffness and strength of the ironing structures, since said layer is still effective to resist horizontal compressive forces, and the natural wood layer 12e is in any event stiff and rigid and imparts similar qualities to the ironing structure, depending on the thickness of the layer 12e.

From the above it will appear that the ironing table structure described, may be made without using the flange 13 and without incorporating in the plastic layers 10 and 11, or either of them, glass fibers in the manner described, the only requirements being that the layers 10 and 11 shall be of thermosetplastic material of suitable strength and thickness, that the core shall be of material highly resistive to compressive strains and shall have a thickness imparting strength and stiffness to the ironing structure, and that said layers and core shall be assembled as described to produce an envelope of waterproof plastic material enclosing and completely surrounding said core; it will appear, that by providing the said ironing structure with an edge flange of thermosetplastic material integral with the layers of said material, which flange continuously surrounds said core and is in intimate and adhesive engagement therewith, the strength and stiffness of said ironing structure are substantially increased, or conversely, that by so using said flange, the same strength and stiffness of said ironing structure are secured as are secured without the use of said flange, but with substantially less material in said layers and said core, and that a corresponding decrease in the weight of said ironing structure is produced, which conduces to its ready portability; it will also appear that either with or without the use of the flange 13, the thermosetplastic resin of the ironing structure may have incorporated in it a substantially uniform dispersal of glass filaments bonded to said resin, which either with or without said flange, substantially increases the stiffness and strength of the corresponding ironing table structure, or conversely, that by so using said glass filaments, the same strength and stiffness of said ironing structure are secured, as are secured without the use of said glass filaments, but with substantially less material in said layers and core than is required in the corresponding structure without the use of said glass filaments, thereby further decreasing the weight of said ironing structure and further conducing to its ready portability; it will also appear that other natural woods, either hard or soft, may be used as a core material instead of balsa wood, but the disadvantage in so doing, is that each of said other natural woods is substantially heavier than balsa wood, and would therefore correspondingly increase the weight of the ironing structure and reduce its ready portability; it will therefore appear, that the most desirable form of the disclosed ironing table structure is the one using the flange 13 and also using a dispersal of glass filaments in the thermosetplastic resin of the structure, together with lightweight core material highly resistive to compressive forces exerted upon it; it may be noted, that balsa wood is expensive, and that boards of compressed cellulose fibers are relatively inexpensive and have compression-resistive properties and weight fairly comparable with balsa wood, from which it appears that said boards of compressed cellulose fibers are desirable as a practical material for the core of the ironing structure.

The ironing table structure described presents a smooth and even ironing surface that is waterproof and that requires no cover cloths or pads. All of the materials in said structure are heat resistant, thereby preventing the excessive loss of heat experienced with ironing boards of heat conductive material; and the non-conductive quality of the upper portion of the ironing structure as to heat projected against it from the iron, results in the reflection back into the articles being ironed of a substantial quantity of heat, correspondingly reducing the heat required from the iron to effectively iron the articles; this results in a high degree of heat efficiency in using the said ironing table structure.

In Figs. 2 and 3, a folding leg structure is illustrated for supporting the ironing table structure at a desired height, which leg structure includes legs 15, 15 which are vertical in use and are pivotally connected at 16, 16 with the ironing structure, and legs 17, 17 which are in an oblique position in use and are pivotally connected at 18, 18 with the ironing structure, together with operating and bracing bars and rods for moving and bracing said legs; said leg structure does not per se constitute a part of the present invention as it is the subject matter of U. S. Patent No. 2,376,165 which issued May 15, 1945; said leg structure is shown herein to illustrate the utility of the compartment 14 formed within the flange 13.

The structure of the invention may be formed by means of female and male dies, the female die of which has a cavity substantially flat at its bottom surface, and bounded by a vertical wall having an inner surface substantially perpendicular to said bottom surface and having the form desired for the outer surface of the completed flange 13 of the ironing table structure; the male die employed has a substantially flat outer surface, and an edge surface substantially perpendicular to said outer surface and of substantially the form of said flange 13, but smaller throughout than the said inner vertical surface of said female die cavity, to produce a desired thickness of said flange; the edge surface of said male die and the inner surface of the vertical wall of said female die, extend vertically for a distance at least as great as the desired width of said flange 13.

In forming the said ironing table structure, the dies are mounted in aligned, centered and spaced relation, preferably with the female die lowermost, and they are heated to a temperature somewhat higher than the flow temperature of the thermosetplastic resin of the top and bottom layers; then the top layer 10 of thermosetplastic resin is placed and centered on the lower die, the core 12 is placed and centered on said top layer, and the bottom layer 11 of thermosetplastic resin is placed and centered on the core; then the top die is forced down into the lower die, until it presses the top layer 10 firmly against the flat surface of said lower die, which operation, because of the heat imparted to the edge portions of said top and bottom layers by said dies, folds the edge portions of said top and bottom layers into the flange recess between said dies, and at the same time flows and fuses the edge portions of said top and bottom layers together, to completely fill said flange recess, the flange thickness and width being controlling factors in determining the initial width of the marginal portions of said top and bottom layers.

The thermosetplastic resin of said top and bottom layers, is preferably a polyester resin which by curing for a short time with a continuation of the die pressure, produces a solidified condition of said plastic resin; when said solidifying has occurred, the top die is raised, and the ironing table structure is removed from the lower die, requiring only a trimming of the edge of the flange 13 to complete it.

The procedure described for making the ironing table structure, is desirable particularly where the material of the top and bottom layers 10 and 11 is originally in sheet form, since said material is available in that form with glass reinforcing filaments incorporated in it.

A modification of said described molding procedure is to pre-form said top and bottom layers 10 and 11 from said sheet material to substantially the required size and shape, and to then complete the procedure with said dies in substantially the manner described. With either of said procedures, a small quantity of liquid thermosetplastic resin may be used to advantage, to intimately bond said top and bottom layers to the top, bottom and edge surfaces of the core of the structure.

It is to be understood that if preferred, in molding said ironing table structure, the thermosetplastic resin of said top and bottom layers 10 and 11 may initially be in liquid form; the procedure then includes supporting the core in centered relation in the lower die and spaced vertically therefrom, pouring a measured quantity of the liquid resin into the lower die, and then forcing the upper die downwardly into the lower die to force the resin to flow into the spaces between the dies, thereby imparting a sheet form to said top and bottom layers and producing a continuous and waterproof envelope of resin entirely surrounding the core; the curing and solidifying of the resin then proceeds as above described.

With any of the molding procedures described, a suitable quantity of plasticizer or softening agent may be added to the resin used in the mold, to initially increase its fluidity and promote its flow into all parts of the mold.

The ironing table structure shown in Figs. 1, 2 and 3, illustrates a size of said structure found to be convenient for most domestic purposes, which may be, for example, about 54 inches long and 14 inches wide, but it will be understood that the invention is equally applicable to sizes both larger and smaller than the size named, without departing from the advantages described for the invention.

It may here be pointed out that the resistance of the ironing structure of the invention to heat conduction is so great, that the bottom surface of said structure does not become unpleasantly warm even after a long period of continuous ironing; in fact, with an ironing structure of smaller size, said structure may be supported on the lap of the ironer, and may be continuously so used, with no discomfort.

While I have shown my invention in the several illustrative embodiments above described, I do not limit myself thereto as I may employ equivalents thereof without departing from the scope of the appended claim.

What I claim is:

An ironing table structure comprising a balsa wood core of predetermined thickness and planar in disposition, completely and permanently incased in a molded seamless envelop of imporous thermosetplastic of uniform thickness approximating one-seventh the core thickness and extending transversely beyond one face of the core around the entire perimeter to form a reinforcing flange in depth substantially equal to the thickness of the core, the thermosetplastic being reinforced with impregnated glass fibers.

References Cited in the file of this patent

UNITED STATES PATENTS

| | | |
|---|---|---|
| 1,522,023 | Metzler | Jan. 6, 1925 |
| 1,575,494 | Lavendier | Mar. 2, 1926 |
| 2,214,824 | Smith et al. | Sept. 17, 1940 |
| 2,253,772 | Edgren | Aug. 26, 1941 |
| 2,281,729 | Thomas | May 5, 1942 |
| 2,314,498 | Hoagland | Mar. 23, 1943 |
| 2,325,493 | Fay | July 27, 1943 |
| 2,335,494 | Fay et al. | Nov. 30, 1943 |
| 2,414,125 | Rheinfrank | Jan. 14, 1947 |
| 2,429,235 | Miskelly et al. | Oct. 21, 1947 |
| 2,481,833 | Foster | Sept. 13, 1949 |
| 2,486,235 | Watt | Oct. 25, 1949 |
| 2,606,275 | Jacowitz | Aug. 5, 1952 |